United States Patent [19]

Siemon, Jr. et al.

[11] Patent Number: 5,093,388
[45] Date of Patent: Mar. 3, 1992

[54] VERY HIGH FRICTION ELEASTOMER FORMULATION FOR USE IN STATIC BRAKING APPLICATIONS

[75] Inventors: John T. Siemon, Jr., Pittsburgh; Joseph F. Meier, Export, both of Pa.

[73] Assignee: The United States of America as represented by the Secretary of the Air Force, Washington, D.C.

[21] Appl. No.: 329,728

[22] Filed: Mar. 28, 1989

[51] Int. Cl.$^5$ .............................................. C08L 11/00
[52] U.S. Cl. ...................... 523/149; 523/150; 523/152; 523/153; 523/155; 523/156; 523/157; 524/519
[58] Field of Search ................ 524/519; 523/149, 150, 523/152, 153, 155, 156, 157; 525/215

[56] References Cited

U.S. PATENT DOCUMENTS

| | | | |
|---|---|---|---|
| 3,601,227 | 8/1971 | Burch | 187/29 R |
| 3,655,827 | 4/1972 | Finlay | 525/215 |
| 4,444,293 | 4/1984 | Paul et al. | 187/87 |
| 4,485,216 | 11/1984 | Musch | 525/215 |

OTHER PUBLICATIONS

Morton, *Rubber Technology Second Edition*, pp. 52, 53, 58, 59, 64 and 191, Van Nostrand Reinhold Co., N.Y., 1973.

*Primary Examiner*—Paul R. Michl
*Assistant Examiner*—Edward Cain
*Attorney, Agent, or Firm*—Robert L. Nathans; Donald J. Singer

[57] ABSTRACT

A high friction brake shoe formulation having a high static friction coefficient in shear of about 1.5 and low adhesion to materials having microscopic pores therein in contact with said brake shoe formulation which comprises a mixture of about 75 phr of neoprene W rubber and about 25 phr of neoprene WHV rubber; a first curing system comprising about 1 phr of a fatty acid, about 5 phr of ZnO, and about 1-3 phr of MgO; and a second curing system comprising about 1.25 phr of sulfur and about 0.6 phr of a sulfur accelerator; together with about 50 phr of a reinforcing agent of N555 or N650 carbon black.

13 Claims, No Drawings

VERY HIGH FRICTION ELEASTOMER FORMULATION FOR USE IN STATIC BRAKING APPLICATIONS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of brake shoes.

An air elevator is a platform constructed as an integral part of a missile launch system which supports the entire weight of the missile during loading and assembly of the missile in the launcher, and must be held at different positions along the length of the launch canister to allow work to be completed on various stages of the missile. The work platform is raised and lowered on a cushion of air and is held in position vertically by rubber lined, hydraulically or pneumatically actuated brake shoes that contact the inside surface of the launch canister. The static or breakaway coefficient of friction between the brake lining and the inside of the launch canister must be high enough to prevent slippage along the canister wall when the platform is loaded, yet must not develop adhesion forces that prevent brake retraction. Also the lining material must be soft enough to prevent chaffing of the canister wall during braking of the platform, since small movements in the platform are unavoidable during application of the brakes.

Of major concern was developing a material with high friction capabilities and little adhesion characteristics. This was a difficult task, since one major component of friction is the interfacial adhesion developed between the contacting surfaces. When two polymer surfaces are brought into contact under pressure, for extended periods of time, there is an opportunity for polymer chains and compound ingredients to diffuse from one material surface into the other. The result is high molecular forces between the materials, approaching the tensile strengths of the polymers themselves. This mechanism of friction is related somewhat to adhesion and is very undesirable for static breaking applications such as that of the air elevator. In this application the canister surface contacting the brake shoe, is coated with a polymer (polyurethane) paint.

It is thus an object of the present invention to provide:

a high friction rubber (brake shoe) formulation that exhibits low adhesion to other polymer materials as a means of developing high shear friction forces;

a high friction rubber formulation which exhibits a static friction coefficient in shear of up to about 1.5;

a high friction rubber formulation highly suitable for static braking applications; and a high friction rubber formulation that exhibits low diffusion of compounding materials into a contacting polymer surface, thereby reducing molecular adhesion.

SUMMARY OF PREFERRED EMBODIMENTS OF THE INVENTION

In order to achieve the requirements cited above, many materials were evaluated for friction and adhesion characteristics under conditions similar to those encountered during operation. Both commercially available brake linings and rubber materials were investigated and proved not to be suitable. Friction coefficients of some more popular types of high friction materials are given in Table 1 below. In addition, over 100 rubber formulations were mixed in the laboratory and evaluated for use in this application, and one compound was found to be exceptionally well suited to this application. The compound formulation is listed in Table 2 below. This compound has a measured static or breakaway friction coefficient of about 1.5, and exhibited minimal adhesion to the polyurethane painted steel in pressure contact with this particular rubber formulation brake shoe for extended time periods.

The present invention is believed to have important commercial applications where static breaking is required, e.g. elevator brakes, cranes and lifts.

DETAILED DESCRIPTION OF PREFERRED EMBODIMENTS OF THE INVENTION

The optimum formulation for the aforesaid air elevator brake shoe in contact with polyurethane paint upon steel is set forth below in Table A; the very high static coefficient of friction in shear is about 1.5.

TABLE A

|  | Parts per 100 Parts of Rubber (PHR) |
|---|---|
| Neoprene WHV | 25 |
| Neoprene W | 75 |
| Stearic Acid | 1 |
| Zinc Oxide | 5 |
| Magnesium Oxide | 1-3 |
| N550 or N650 Carbon Black | 50 |
| Sulfur | 1.25 |
| Agerite Stalite S (Optional) | 2 |
| Wingstay 100 | 1 |
| Dixie Clay | 20 |
| Unads | 0.6 |

Neoprene is polychloroprene. Neoprene WHV has the same molecular composition as neoprene W, but has longer molecular chains. More specifically, as stated in U.S. Pat. No. 4,275,181 assigned to E. I. Du Pont, "Neoprene" W is a polychloroprene available from Du Pont, having a Mooney viscosity of 50. See the footnote following Table I in col. 5. As stated in line 38 of col. 5, "Neoprene" WHV has a Mooney viscosity of 120. This patent also states that "The solid chloroprene polymer (neoprene) . . . is a well known material. "See col. 2, lines 43-45. For further details regarding the nature of "neoprene W" and "neoprene WHV" see U.S. Pat. No. 3,965,061, and in particular, lines 57 of col. 1 through line 38 of col. 2. These patents are incorporated by reference herein.

Agerite Stalite S is alkylated diphenylamines (antioxidant, anti-ozonate).

Wingstay 100 is a diaryl-p-phenylene diamine.

Dixie Clay is kaolin clay.

Unads is tetramethylthiuram monosulfide (S accelerator).

Table B lists the coefficient of friction (CF) of some of the more widely used high friction materials. The coefficient of friction of 1.5 of the optimum material of Table A thus sharply differs from the less desirable lower coefficients of Table B.

TABLE B

|  | CF |
|---|---|
| Clutch Facing Material | 0.35 |
| Nylon | 0.4 |
| PVC | 0.5 |

TABLE B-continued

| | CF |
|---|---|
| Laminated Plastic | 0.35 |
| Phenolic/Asbestos | 0.8 |
| Acrylic Rubber | 0.61 |

It is believed that when the brake shoe of the formulation of Table A is deformed, during mechanical loading of the elevator platform having the brake shoe coupled thereto, the formulation is pushed into the microscopic pores of the porous polymer paint upon the launch tube adjacent the platform. The shoe material penetrates the pores by probably less than a fraction of a mil. This probably results in the dramatically high coefficient of friction of about 1.5. Thus, similar good results should be obtained with other facing
materials such as epoxy and acrylic paints, and alkyd enamel, having microscopic pores therein.

While a first curing system of a fatty acid, with ZnO and MgO, together with a secondary curing system of sulfur and a sulfur accelerator is preferred, a good but somewhat more tacky shoe would result, by eliminating one of these curing systems. Should the elimination of chaffing not be required for other applications, e.g., lift trucks, cranes or elevators, the kaolin clay could be omitted. In like manner, it is believed that the Wingstay 100 and the Agerite Stalite S components could be omitted for certain applications. Other carbon blacks than those listed in Table A, and fatty acids other than stearic acid would probably produce beneficial results. The numerical carbon black designations are standard designations of the American Society of Testing Materials. While neoprene rubbers are preferred, acceptable results may be attainable by substituting butyl or styrene butadyne rubbers.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

However, the following claims are intended to be restricted in scope to cover solely high friction brake shoes.

What is claimed is:

1. A high friction brake shoe having a static friction coefficient in shear of up to 1.5 and low adhesion to a polymer material in contact with said brake shoe, said polymer material having microscopic pores therein in contact with said brake shoe, said brake shoe comprising a mixture of about 75 phr of a polychloroprene rubber having a Mooney viscosity of about 50 (type W) and about 25 phr of a polychloroprene rubber having a Mooney viscosity of about 120 (type WHV); a curing system; and about 50 phr of a reinforcing agent comprising carbon black.

2. The brake shoe of claim 1 wherein said curing system further comprises a first curing system having about 1 phr of a fatty acid, about 5 phr of ZnO and about 1-3 phr of MgO and a second curing system having about 1.25 phr of sulfur and about 0.6 phr of a sulfur accelerator.

3. The brake shoe of claim 2 further including about 1 phr of an antioxidant, and wherein said sulfur accelerator consists of tetramethylthiuram monosulfide.

4. The brake shoe of claim 3 wherein said antioxidant consists of a diaryl-p-phenylene diamine.

5. The brake shoe of claim 1 further including about 20 phr of a kaolin clay extender to prevent chaffing of said materials in contact with said brake shoe rubber formulation.

6. The brake shoe of claim 2 further including about 20 phr of a kaolin clay extender to prevent chaffing of said materials in contact with said brake shoe rubber formulation.

7. The brake shoe of claim 3 further including about 20 phr of a kaolin clay extender to prevent chaffing of said materials in contact with said brake shoe rubber formulation.

8. The brake shoe of claim 1 further including about 2 phr of an alkylated diphenylamine antioxidant for preventing brittleness of the formulation.

9. The brake shoe of claim 2 further including about 2 phr of an alkylated diphenylamine antioxidant for preventing brittleness of the formulation.

10. The brake shoe of claim 4 further including about 2 phr of an alkylated diphenylamine antioxidant for preventing brittleness of the formulation.

11. The brake shoe of claim 5 further including about 2 phr of an alkylated diphenylamine antioxidant for preventing brittleness of the formulation.

12. A high friction brake shoe having a static friction coefficient in shear of up to 1.5 and low adhesion to a polymer material in contact with said brake shoe, said polymer material having microscopic pores therein in contact with said brake shoe, said brake shoe comprising a mixture of about 75 phr of a polychloroprene rubber having a Mooney viscosity of about 50 (type W), and about 25 phr of a polychloroprene rubber having a Mooney viscosity of about 120 (type WHV); a first curing system comprising about 1 phr of a fatty acid, about 5 phr of ZnO, and about 1-3 phr of MgO; and a second curing system comprising about 1.25 phr of sulfur and about 0.6 phr of a sulfur accelerator; together with about 50 phr of a reinforcing agent comprising carbon black.

13. The brake shoe of claim 12 wherein said carbon black is selected from the group consisting of N555 and N650 carbon black.

* * * * *

UNITED STATES PATENT AND TRADEMARK OFFICE
CERTIFICATE OF CORRECTION

PATENT NO. : 5,093,388
DATED : 3 MARCH 1992
INVENTOR(S) : John T. Siemon, Jr. et al It is certified that error appears in the above-identified patent and that said Letters Patent is hereby corrected as shown below:

On the title Item [54]

Change the word "ELEASTOMER" to —ELASTOMER—.

Signed and Sealed this

Third Day of October, 1995

Attest:

BRUCE LEHMAN

*Attesting Officer*         *Commissioner of Patents and Trademarks*